H. S. EPES.
SUBMARINE BOAT.
APPLICATION FILED APR. 24, 1909.
1,126,624.
Patented Jan. 26, 1915.
6 SHEETS—SHEET 1.
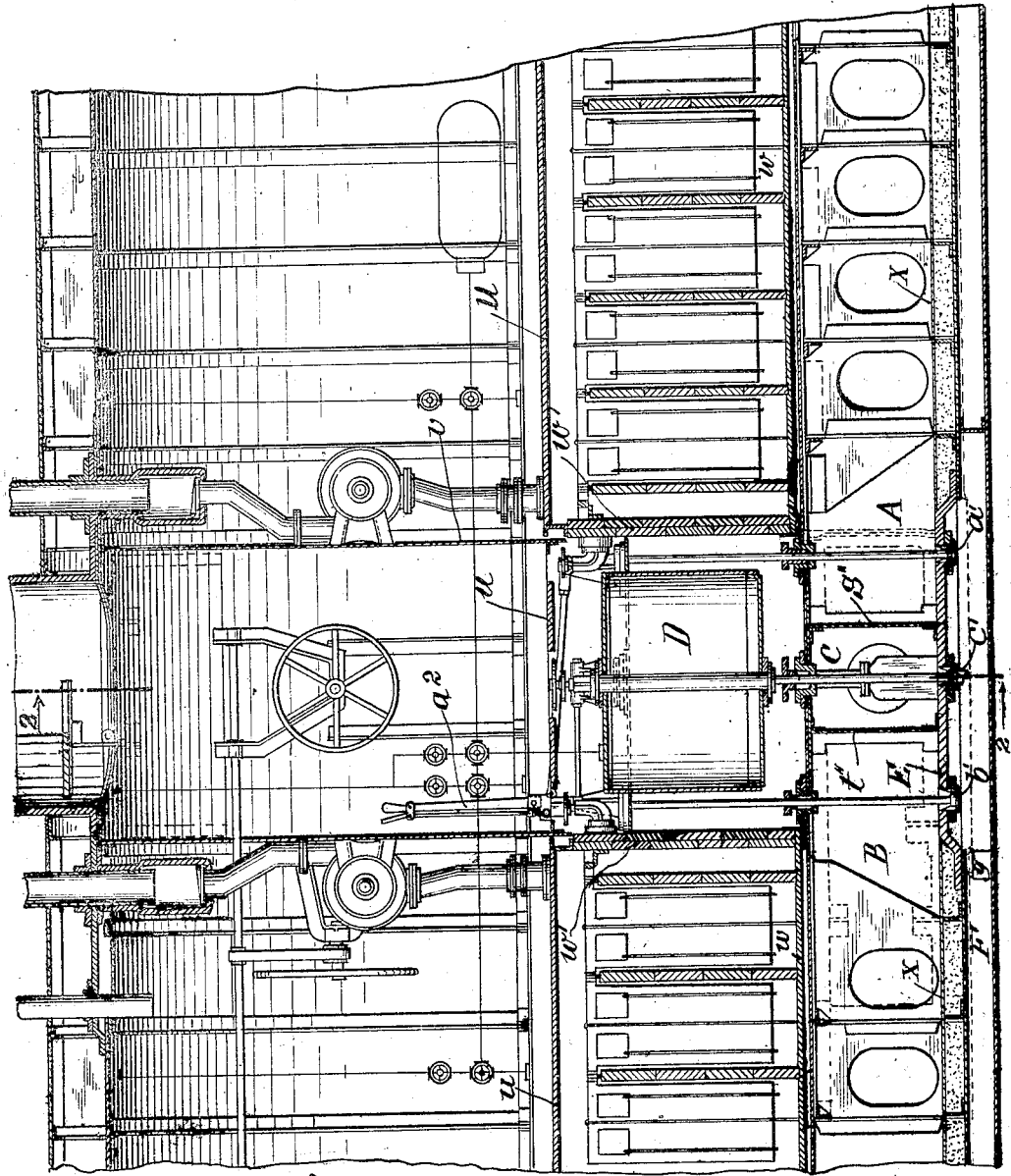

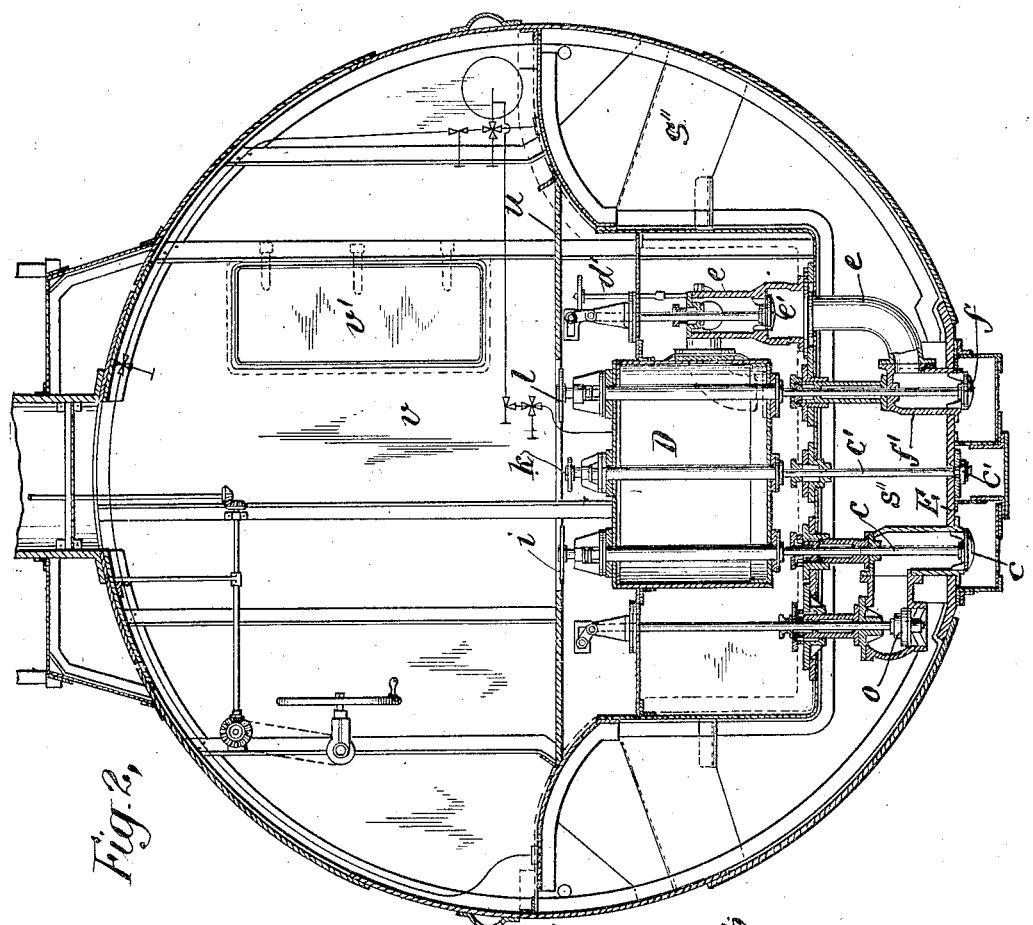
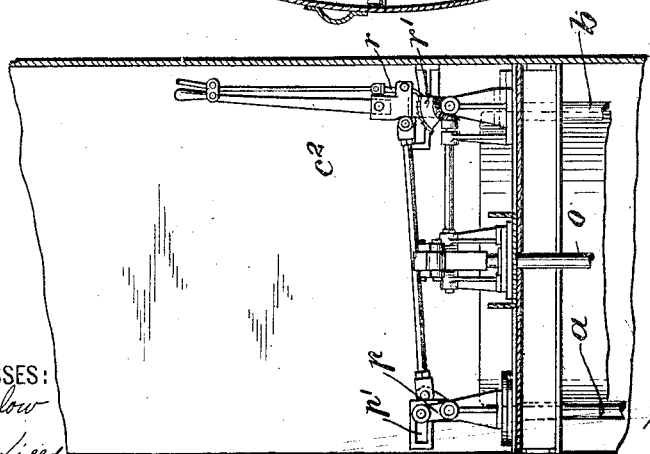

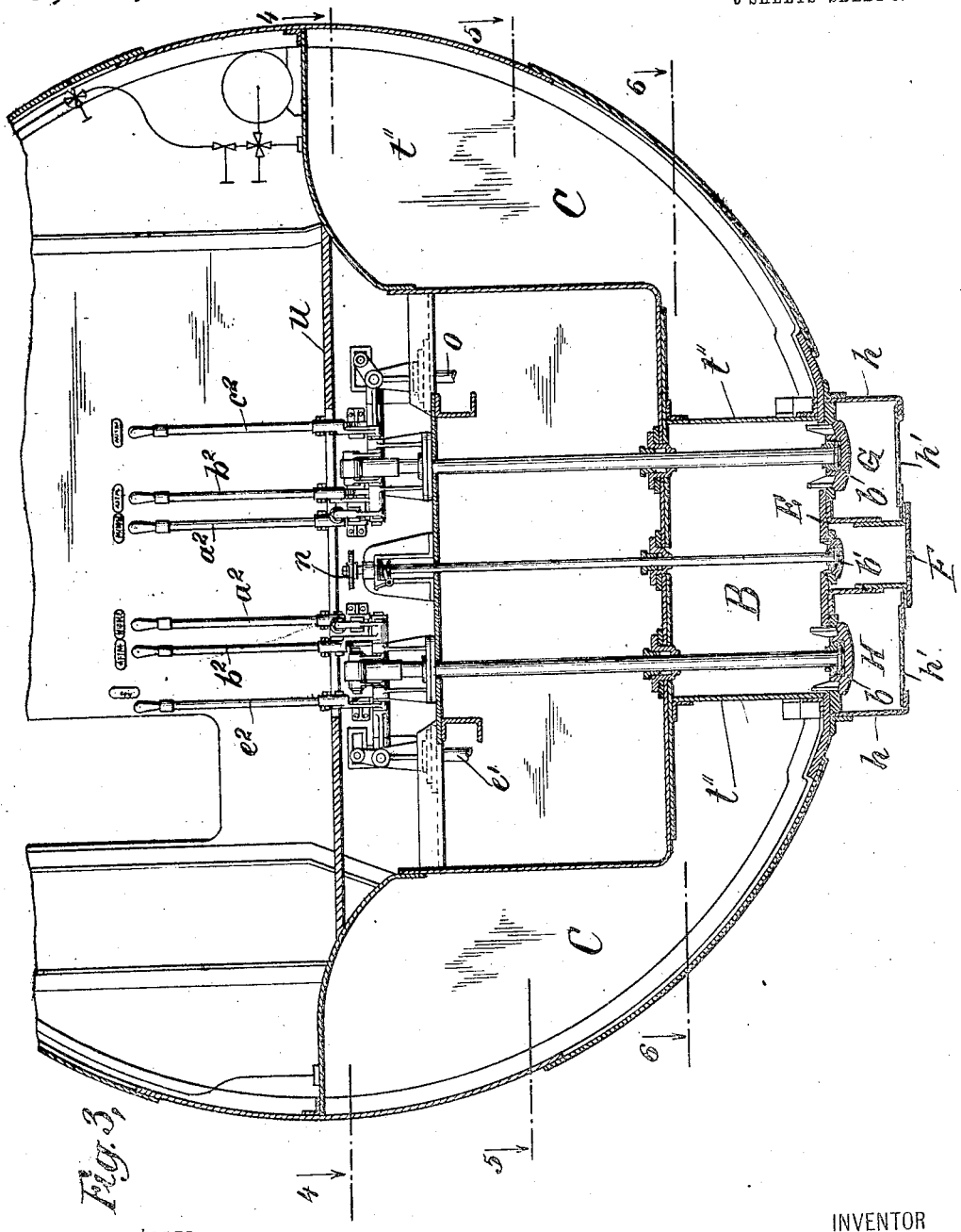

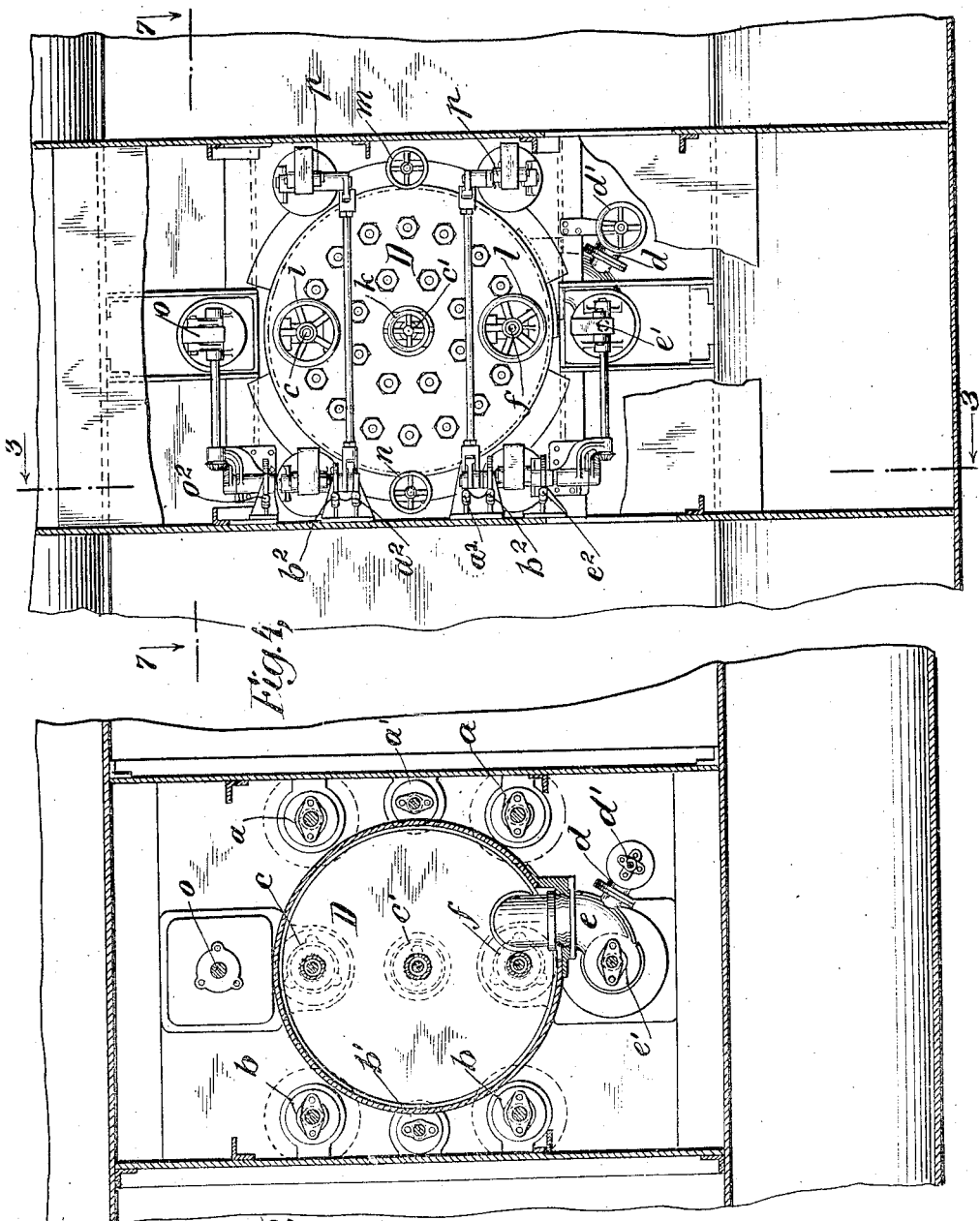

H. S. EPES.
SUBMARINE BOAT.
APPLICATION FILED APR. 24, 1909.
1,126,624.
Patented Jan. 26, 1915.
6 SHEETS—SHEET 5.
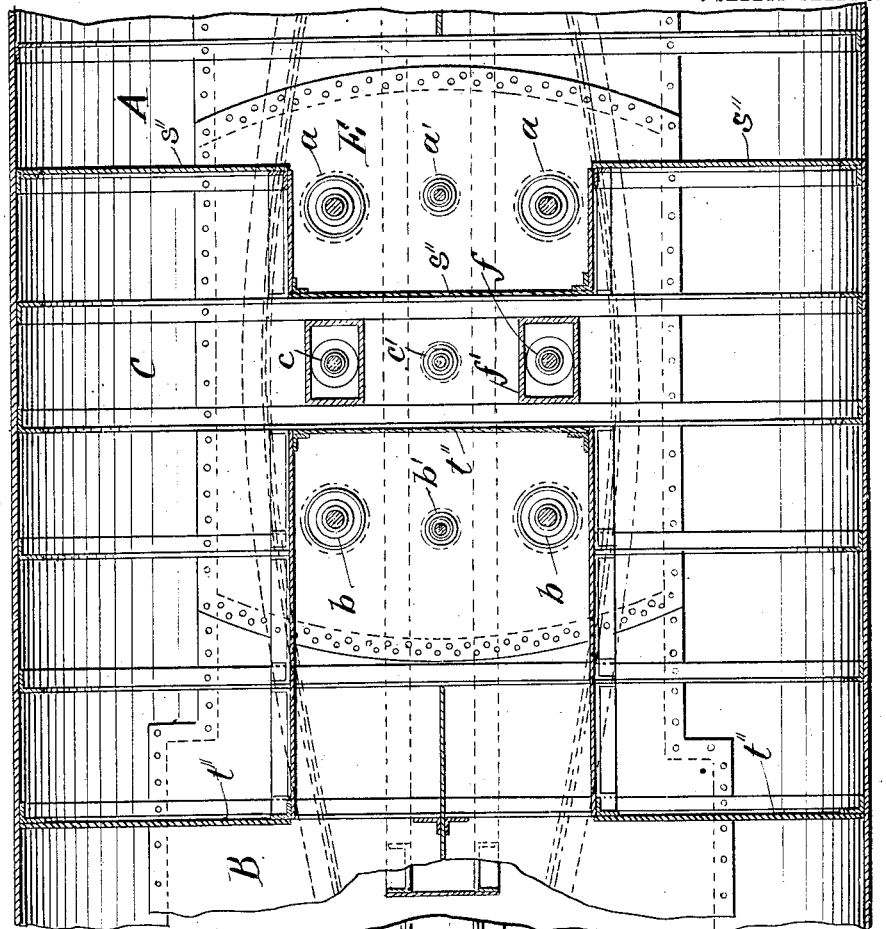
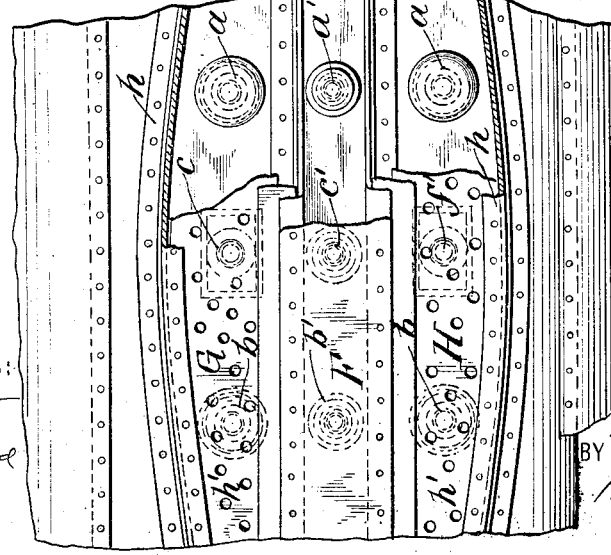
WITNESSES:
L. H. Barlow
L. B. Penfield
INVENTOR
Henry S. Epes
BY
ATTORNEYS

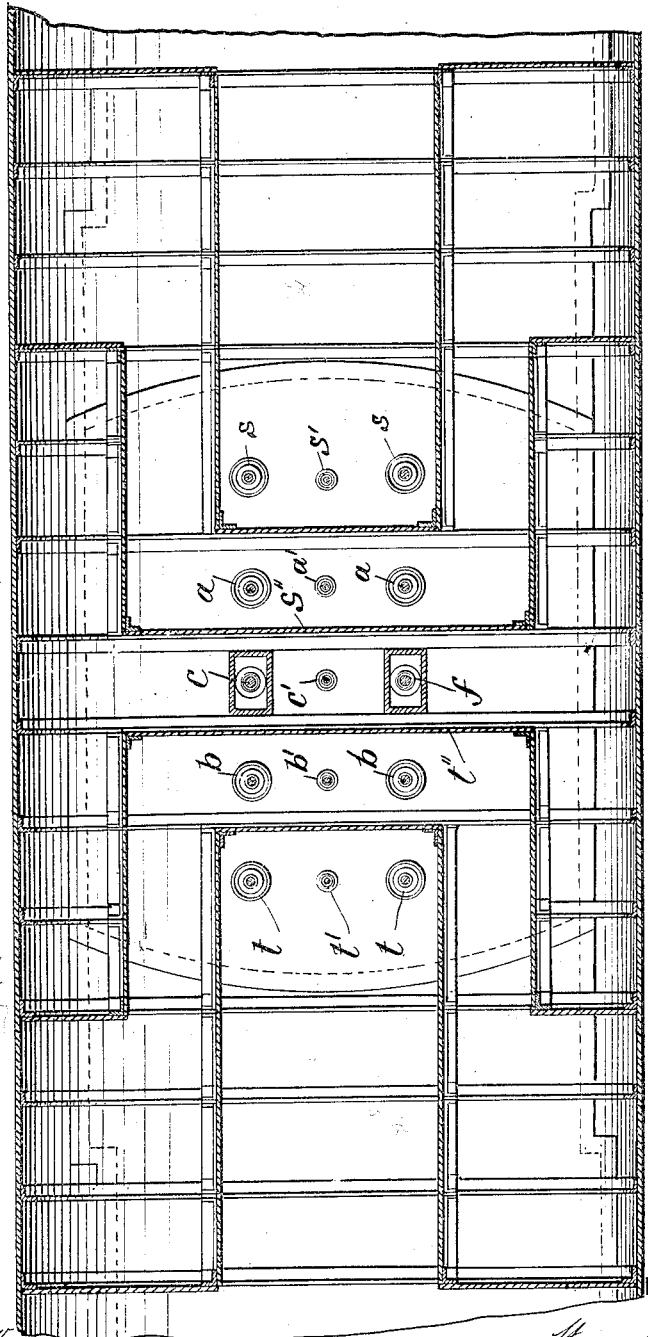

UNITED STATES PATENT OFFICE.

HENRY S. EPES, OF QUINCY, MASSACHUSETTS, ASSIGNOR TO ELECTRIC BOAT COMPANY, OF NEW YORK, N. Y., A CORPORATION OF NEW JERSEY.

SUBMARINE BOAT.

1,126,624.  Specification of Letters Patent.  Patented Jan. 26, 1915.

Application filed April 24, 1909. Serial No. 491,915.

*To all whom it may concern:*

Be it known that I, HENRY S. EPES, a citizen of the United States, residing at Quincy, in the county of Norfolk and State of Massachusetts, have invented certain new and useful Improvements in Submarine Boats; and I do hereby declare the following to be a full, clear, and exact description of the invention, such as will enable others skilled in the art to which it appertains to make and use the same.

The invention relates particularly to the hull construction, and arrangement of ballast-tanks, in submarine boats, whereby the ballast-tank flooding and discharging valves may be grouped together preferably beneath the conning-tower, and under the eye of the commanding officer; and whereby the water may be completely discharged from the ballast-tanks through outlets at the extreme bottom thereof, without the use of spouts, thereby making easy a complete draining of the tanks, and at the same time giving to the outflowing water the full effect, in acting downwardly against the water of submergence, to force the vessel to the surface.

In the drawings, I have illustrated in some detail the construction and arrangement of parts in a submarine boat built in accordance with my invention, in order that the nature and objects of the invention may, from a study of this specific embodiment, be completely understood.

In the drawings, Figure 1 is a central vertical section of a portion of the torpedo boat amidships showing the control station, the forward and aft storage battery tanks separated by the midship-well, and beneath these the ballast-tanks in cross section. Fig. 2 is a transverse section on the line 2—2 of Fig. 1 looking in the direction of the arrows. Fig. 3 is a transverse section on a larger scale taken on the line 3—3 of Fig. 4 and looking in the direction of the arrows, the section illustrating particularly the arrangement of flooding and discharge valves and their operating levers. Fig. 4 is a plan taken on the line 4—4 of Fig. 3, showing the arrangement of parts in the midship-well. Fig. 5 is a similar plan on the line 5—5 of Fig. 3, showing the adjusting-tank in cross section and the relative arrangement of the various ballast-tank flooding and discharge valves. Fig. 6 is a similar plan on line 6—6 of Fig. 3, and showing the relative arrangement of the main forward and aft ballast-tanks and the auxiliary ballast-tank with their flooding and discharge valves. Fig. 7 is a transverse section of the control station and midship-well on the line 7—7 of Fig. 4 and looking in the direction of the arrows. Fig. 8 is a plan view partly in section showing the bottom of the vessel amidships and illustrating the arrangement of the duct keel and valve-protecting flanges as well as the relative arrangement of the ballast-tank flooding and discharge valves, and Fig. 9 is a sectional plan similar to Fig. 6, but illustrating a modified arrangement of ballast-tanks by which the forward and after main ballast-tanks are subdivided and the flooding and discharge valves are still grouped beneath the control-station.

In the construction illustrated in Figs. 1–8 inclusive the vessel has (see Fig. 6) a forward main ballast-tank A provided with two flooding and discharge valves $a$, and the smaller drainage valve $a'$ communicating with the duct keel and the pump of the vessel in a manner which will be further described; an after main ballast-tank B having two flooding and discharge valves $b$ and drainage valve $b'$; and the auxiliary ballast-tank C having the flooding and discharge valve $c$ and the drainage valve $c'$, and through which passes the stem of adjusting-tank flooding and discharge valve $f$ and its casing $f'$, the arrangement of the bulkheads, $s''$ and $t''$ defining the forward and after main ballast-tanks and auxiliary tank being such that the after main ballast-tank is separated from the forward main ballast-tank by a single frame space at the center of the vessel, as shown, and in this frame space the I-shaped auxiliary tank extends from one side of the vessel to the other. It is possible by such a construction to place the flooding, discharge and drainage valves for these several tanks close together so that they may be directly controlled by levers in the control station above. In addition to these main and auxiliary ballast-tanks there is provided the adjusting tank D which is now commonly employed in submarine vessels of the United States Navy and the function of which is fully set forth in patent to Lawrence Y. Spear, No. 805,496, granted November 28, 1905. It is only necessary here to point out that this tank D is in communication with the auxiliary ballast-tank through the pipe connections $d$ controlled by valve $d'$, and is in communication with the external water through the pipe connections $e$ controlled by valve $e'$, and leading to casing $f'$ within the auxiliary ballast-tank and the outlet from which is controlled by the adjusting-tank flooding and discharge valve $f$. For the purpose of forming a suitable support for the various valve seats which open outwardly through the bottom of the hull, the bottom of the hull casing or shell amidships is formed of a heavy plate, or a casting E, the shape and relative position of which can best be understood from an inspection of Figs. 1, 3 and 6. Extending lengthwise of the vessel and across the bottom face of plate E is a duct keel F which is closed against entry of the surrounding water and is in communication with the vessel's pumps (not shown) through the opening $g$ (see Fig. 1) and it is into this duct keel that the drainage valves $a'$, $b'$ and $c'$ open. Upon either side of the duct keel, and protecting the several flooding and discharge valves $a$, $b$, $c$ and $f$, are the bulged guarding structures G and H, each comprising a depending angle iron $h$ outside of the flooding and discharge valves, and a perforated protecting plate $h'$ supported by the depending pieces $h$ and the parts of the duct keel, all as clearly illustrated in Figs. 3 and 8.

It will be seen from the drawings, particularly Fig. 1, that the main deck of the vessel is formed by a flooring $u$ supported generally on cross braces, and this main deck is partitioned off amidship to form a control station, by the partitions or bulk-heads $v$ having doorways $v'$. Beneath the main deck are the storage battery compartments having flat bottoms $w$ and divided into forward and after closed compartments by cross partitions $w'$; which partitions also serve to define the midship-well beneath the control station and containing the adjusting-tank D. Beneath the battery compartments and extending up at the sides thereof, as shown in Fig. 2, are the forward and after main ballast-tanks and the auxiliary ballast tank defined in part by the inner plating of the hull and partly by the cross partitions, which where they cross the valve plate E, act as plate girders to stiffen that plate, which is further stiffened by the duct keel and members $h$ of the valve guards. It will be noted that the valve plate E is flat, and not bulged to conform to the contour of the hull, and that the bottom cement line $x$ is flush with the upper surface of the flat plate so that the formation of pockets in the bottoms of the main ballast-tanks is avoided and those tanks may be completely drained. From the foregoing it will be understood that the forward main ballast-tank has two flooding and discharge valves $a$ which communicate with the spaces defined by the guarding structures G and H; the after main ballast-tank has two flooding and discharge valves $b$ which likewise communicate with the spaces defined by the guarding structures G and H; the auxiliary tank has a flooding and discharge valve $c$ communicating with the space defined by the structure G; and the adjusting tank D has a flooding and discharge valve $f$ communicating with the space defined by the structure H and open to the water. The several tanks may thus be flooded or emptied by the operation of their valves and of appropriate mechanism for increasing the pressure within the tanks when it is desired to discharge their contents. Such mechanism is typified in Figs. 1, 2 and 3 of the drawings by a diagrammatic showing of a compressed air supply system. It will be further understood that the forward main ballast-tank has a drainage valve $a'$, the after main ballast-tank a drainage valve $b'$, and the auxiliary ballast-tank a drainage valve $c'$, all of these drainage valves opening into the duct keel and serving to completely drain the tanks; and that the stems of all of these valves extend up through the midship-well in position to be controlled by appropriate hand-levers or wheels in the control station.

The construction and arrangement of the controlling hand-levers will be best understood by reference to Figs. 3, 4, and 7 of the drawings, from which it will be seen that the three valve stems which extend through the tank D, namely, the stems of valves $c$, $c'$ and $f$ are controlled by hand-wheels $i$, $k$ and $l$ set in openings in the floor of the conning-tower station and operating in a well-known manner, which will be understood by reference to Fig. 2 of the drawings without further description. The drainage valves $a'$ and $b'$ are likewise operated by hand-wheels $m$ and $n$ respectively, as shown in Fig. 4. It will be observed that the valves $c$ and $f$, communicating directly with the water, are in fact respectively supplementary to the valve $o$, which is the effective auxiliary tank flooding and discharge valve, and to the valve $e'$, which is the effective adjusting tank flooding and discharge valve. Therefore, the valves which are operated by hand wheels are the three drainage valves and the supplementary valves $c$ and $f$, whereas all the valves which must be operated in an emergency, namely the forward and aft main ballast-tank flooding and discharge valves, the auxiliary ballast-tank flooding and discharge valve and the adjusting-tank flooding and discharge valve, are controlled by the hand levers $a^2$, $b^2$, $c^2$ and $e^2$ respectively. The mode of operation of the valves by the levers is in substance the same in each case, and will be understood from an examination of Figs. 4 and 7. Each hand lever is connected to a shaft (either directly or by suitable connecting rods or gears) which shaft carries a crank as indicated for example at $p$, the crank engaging a horizontal slot $p'$ in a head on the upper end of the particular valve stem. My this construction when the hand lever is turned it turns the shaft and crank and raises or lowers the valve stem and valve. Each hand lever carries a locking-dog $r$ engaging a rack $r'$ in the well-known manner to hold the lever in set position. By this arrangement all of the control valves of the ballast-tanks and the adjusting-tank are under the immediate control of a person in the control station, and all of those valves which it is necessary to actuate quickly in an emergency are provided with hand levers which extend up conveniently within reach.

There is indicated in Fig. 9 an arrangement in which the main ballast tanks are sub-divided, and in this case those divisions of the tanks which are farthest removed from the center of the vessel have portions projecting toward the center and containing the flooding valves $s, s, t, t$ and the discharge valves $s', t'$, so that in this case also the flooding and discharge valves of all the tanks are grouped beneath the control station.

What I claim is:—

1. A submarine boat having forward and after main ballast tanks, an auxiliary ballast tank, and an adjusting ballast tank, flooding and discharging valves for said tanks grouped together in the bottom of the boat, a control station, and valve operating mechanism extending up within the boat into the control station.

2. In submarine boats, ballast-tanks having flooding and discharge and drainage outlets opening from the bottom of the tanks downwardly to the water of submergence beneath the hull of the boat, and a duct keel, the drainage outlets opening into the duct keel and the flooding and discharge outlets opening in proximity to but outside of, the duct keel, valves controlling said outlets, and a guard structure secured to the bottom of the boat outside of the flooding and discharge valves.

3. A submarine boat having within its hull a main deck, beneath that forward and after storage battery compartments separated amidship by a midship-well, an adjusting ballast tank within the midship-well, main ballast tanks and a centrally located auxiliary ballast tank beneath the battery compartments and the midship-well, a valve controlled conduit between the auxiliary ballast tank and the adjusting ballast tank, and a conduit leading from the adjusting ballast tank to the external water, substantially as described.

4. A submarine boat having within its hull a main deck, and beneath that forward and after storage battery compartments separated amidships by a midship-well, an adjusting ballast-tank within the midship-well, and bulkheads beneath the battery compartments and the midship-well defining, with the hull of the vessel, forward and after main ballast-tanks and an auxiliary ballast-tank, flooding and discharge valves for said ballast-tanks grouped beneath the midship-well, a control station, and valve-operating mechanism extending up through the midship-well within reach of a person in the control-station.

5. A submarine boat having within its hull a main deck and beneath that forward and after storage battery compartments separated amidships by a midship-well, a regulating ballast-tank within the midship-well, a heavy valve plate in the bottom of the hull below the midship-well, and bulkheads extending across said plate and defining, with the hull of the vessel, one or more forward and after main ballast-tanks and an auxiliary ballast-tank, flooding and discharge valves for said ballast tanks seated in said valve plate, a control plate, and valve operating mechanism extending up through the midship well within reach of a person in the control station.

6. In a submarine boat, forward and after main ballast-tanks having portions thereof projected into close proximity amidships, a substantially I-shaped auxiliary ballast-tank having its stem lying between the main ballast-tanks, and valves for said tanks grouped amidships in the projected portions of the main ballast-tanks and the stem portion of the auxiliary ballast-tank.

In testimony whereof I affix my signature, in presence of two witnesses.

HENRY S. EPES.

Witnesses:
 THEODORUS S. BAILEY,
 WILLIAM R. SANDS.

Correction in Letters Patent No. 1,126,624.

It is hereby certified that in Letters Patent No. 1,126,624, granted January 26, 1915, upon the application of Henry S. Epes, of Quincy, Massachusetts, for an improvement in "Submarine Boats," an error appears in the printed specification requiring correction as follows: Page 3, line 9, for the word "My" read *By;* and that the said Letters Patent should be read with this correction therein that the same may conform to the record of the case in the Patent Office.

Signed and sealed this 23rd day of February, A. D., 1915.

[SEAL.]
J. T. NEWTON,

*Acting Commissioner of Patents.*